April 13, 1943.    DE WITT CLAUSEN    2,316,405
TURNING MACHINE
Filed June 5, 1940    5 Sheets-Sheet 1

Inventor:
DeWitt Clausen
By Parker, Carlson,
Pitzner & Hubbard
Attorneys

April 13, 1943.  DE WITT CLAUSEN  2,316,405
TURNING MACHINE
Filed June 5, 1940    5 Sheets-Sheet 2

Inventor:
De Witt Clausen
BY
Attorneys

April 13, 1943. DE WITT CLAUSEN 2,316,405
TURNING MACHINE
Filed June 5, 1940 5 Sheets-Sheet 3
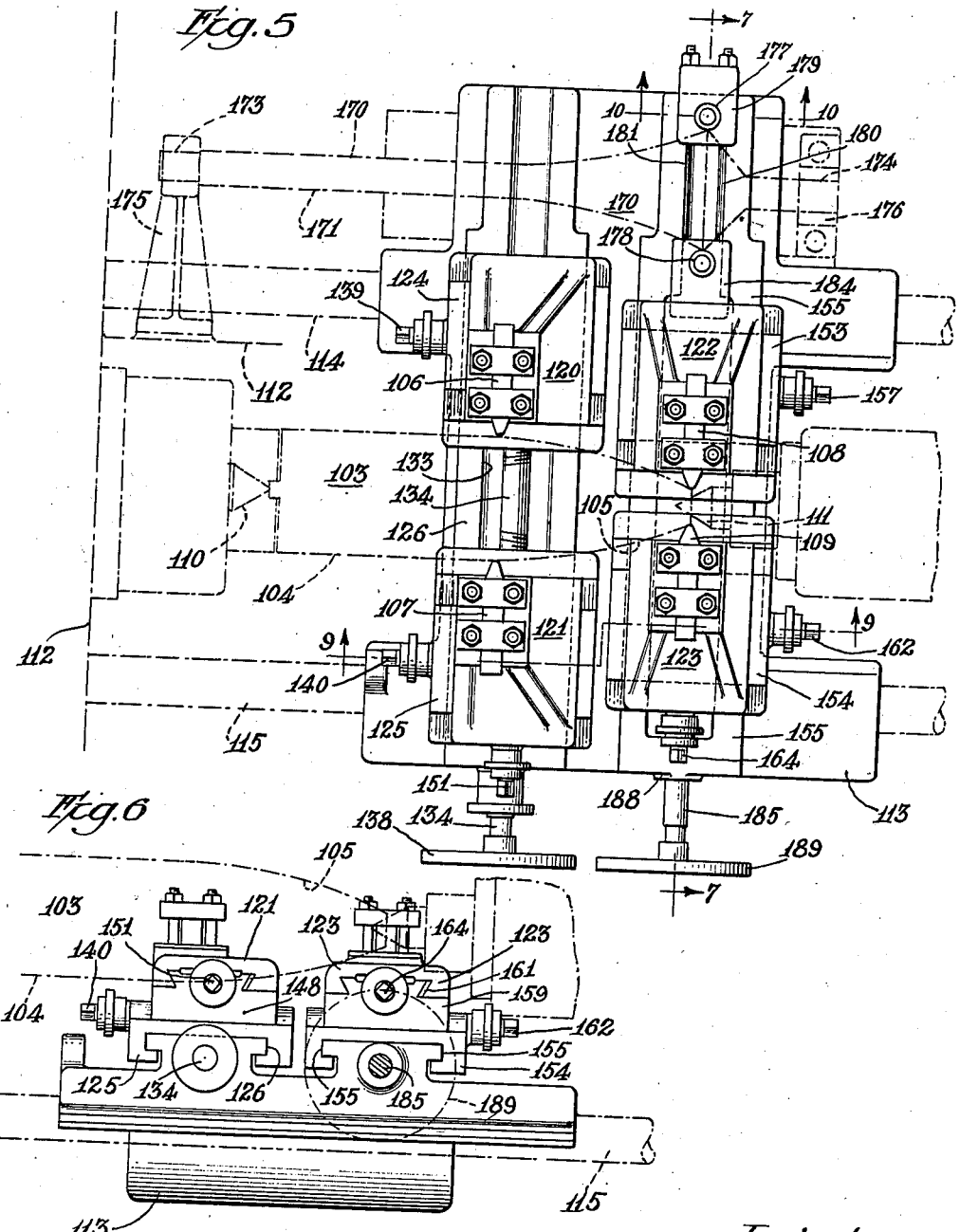

April 13, 1943.                DE WITT CLAUSEN                  2,316,405
                                TURNING MACHINE
                             Filed June 5, 1940              5 Sheets-Sheet 4
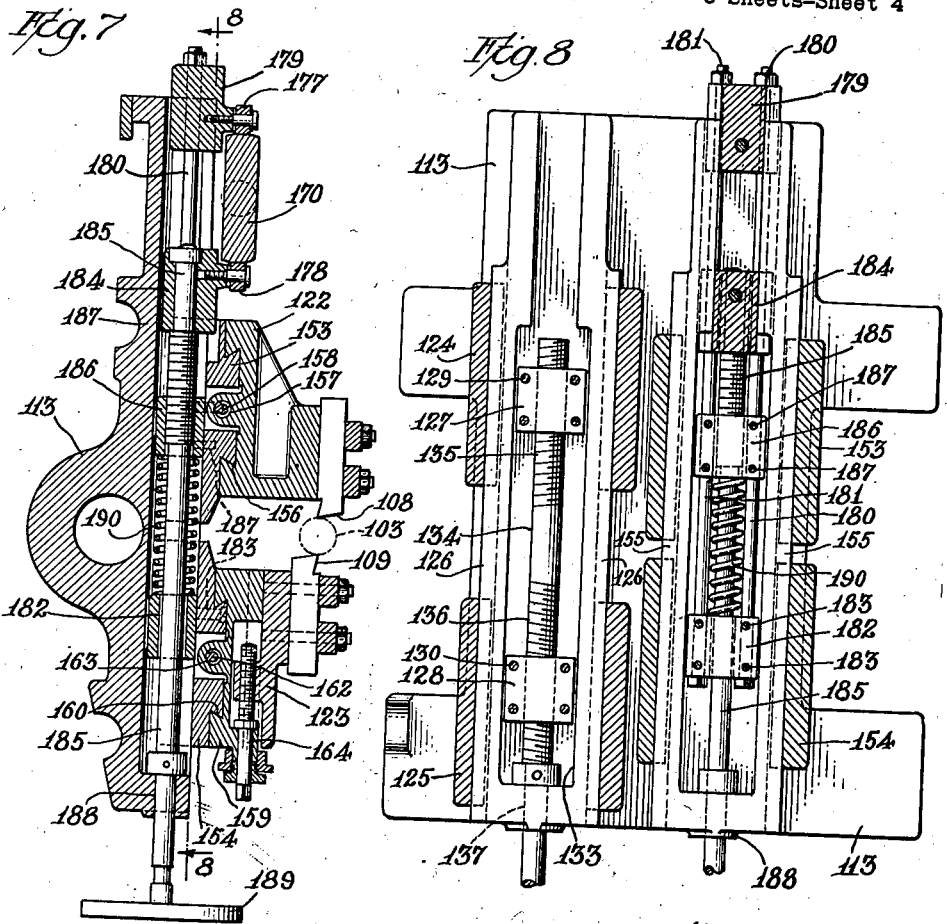
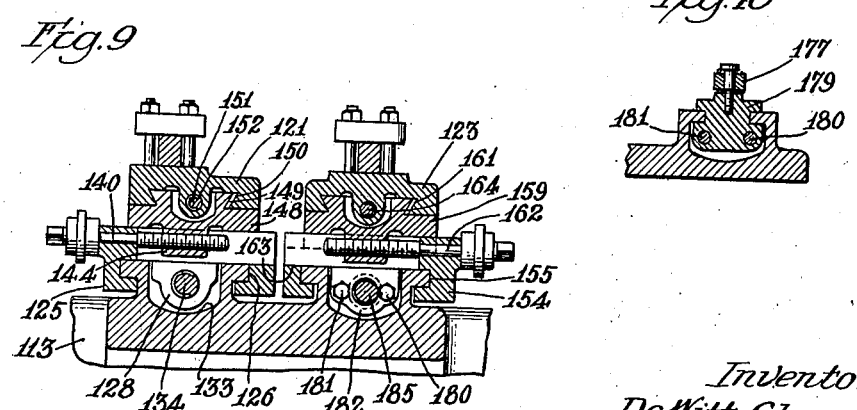
Inventor:
DeWitt Clausen

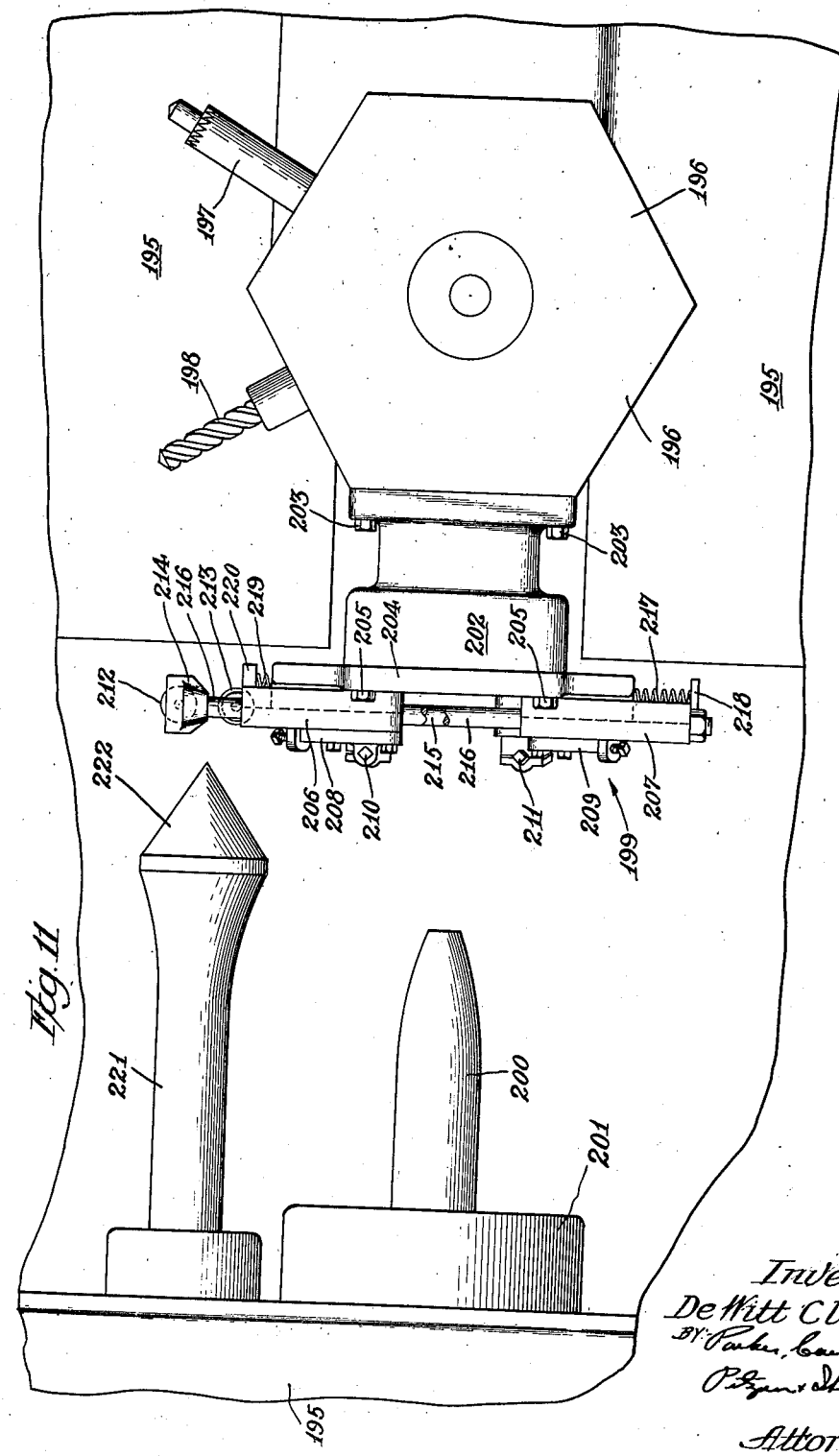

Patented Apr. 13, 1943

2,316,405

UNITED STATES PATENT OFFICE 2,316,405

TURNING MACHINE

De Witt Clausen, Akron, Ohio, assignor to Lucien I. Yeomans, Incorporated, Chicago, Ill., a corporation of Illinois Application June 5, 1940, Serial No. 338,974

12 Claims. (Cl. 82—14)

This invention relates to turning machines and has more particular reference to the contour turning of metal bodies of circular cross section.

A general aim of the invention is to provide a new and improved former-controlled contour turning atachment for a machine of the above mentioned general type.

It is an object of the invention to provide a novel former-controlled contour turning machine wherein cutting tools oppositely disposed radially of a workpiece are separately controlled by cam followers disposed on the opposite sides of a former or template.

It is a further object of the invention to provide a machine of this type wherein the former is fixed in spaced parallel relation to the workpiece, each tool being connected with one of the followers for causing relative transaxial movement between the tool and the workpiece in conformity with the side of the former which is located relatively opposite to or in non-conforming relation to the side of said workpiece being engaged by the tool.

It is a further object of the invention to provide a machine of this type wherein there is substantially no bending stress on either the former or workpiece during operation on a workpiece having a circular cross section, there being substantially equal and opposite compression on their opposite sides at all times.

Further objects and advantages will become apparent from a consideration of the following detailed description and drawings in which:

Fig. 5 is a somewhat diagrammatic plan view of a modified form of the invention applied to a conventional turning lathe.

Fig. 6 is a side elevation of the tool supporting means shown in Fig. 5.

Fig. 7 is a sectional view of the former-controlled contour turning attachment shown in Fig. 5 and taken along line 7—7.

Fig. 8 is a sectional view taken along line 8—8 of Fig. 7.

Fig. 9 is a vertical sectional view of said attachment taken along the line 9—9 of Fig. 5.

Fig. 10 is a detail sectional view of a cam follower and support taken along line 10—10 of Fig. 5.

Fig. 11 is a somewhat diagrammatic view of a conventional turret lathe equipped with a modified form of former-controlled contouring attachment.

Figure 1:
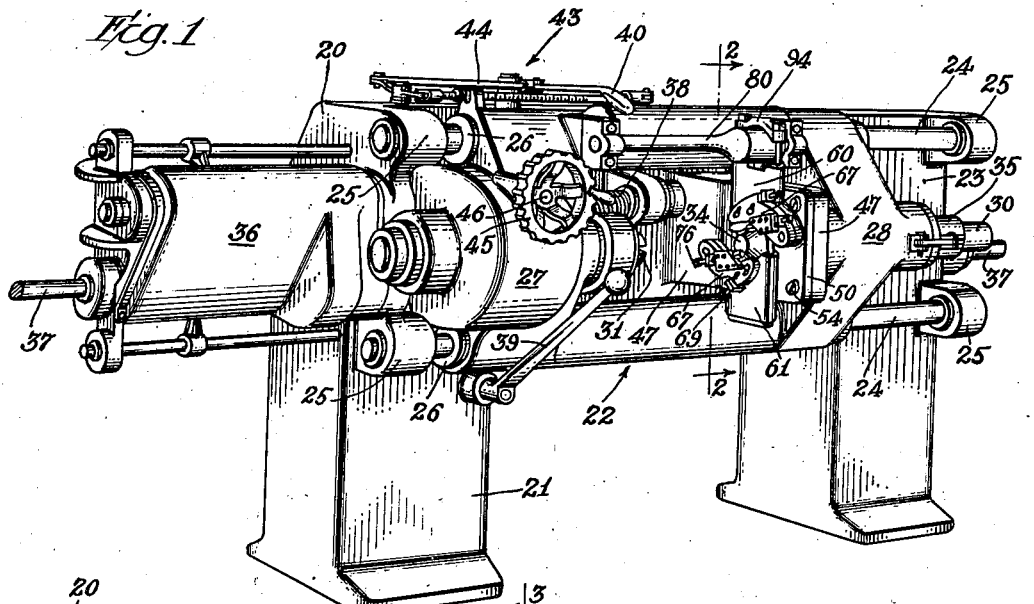
Figure 1 is a perspective view of a machine embodying the features of the invention.
Figure 2:
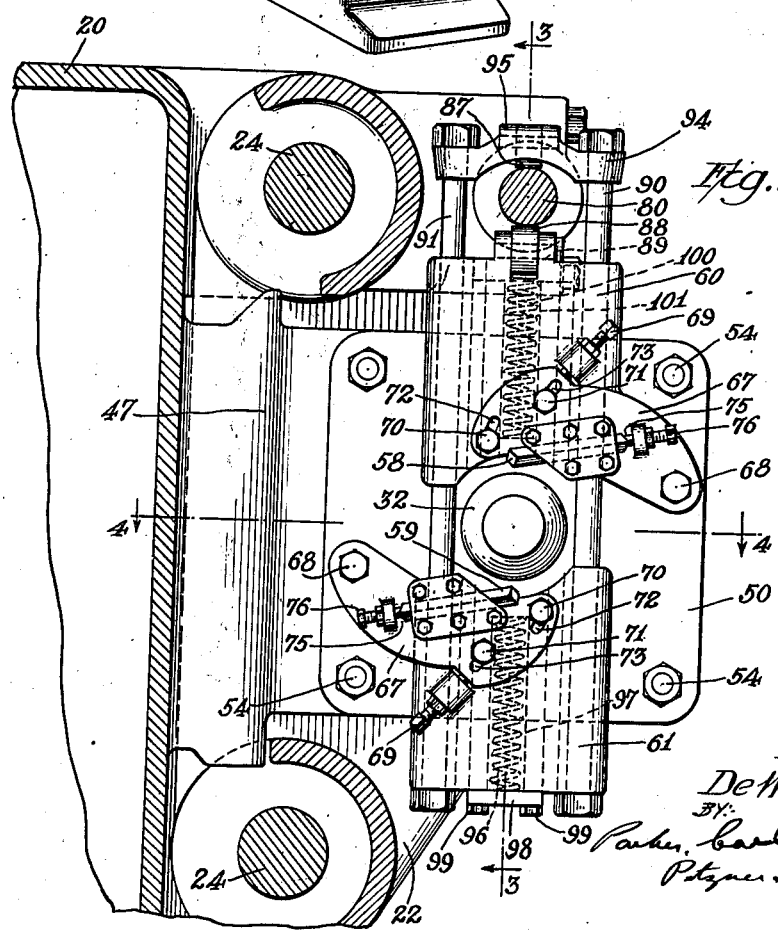
Fig. 2 is an enlarged fragmentary sectional view on line 2—2 of Fig. 1 showing the details of the former-controlled contour cutting attachment in side elevation.
Figure 3:
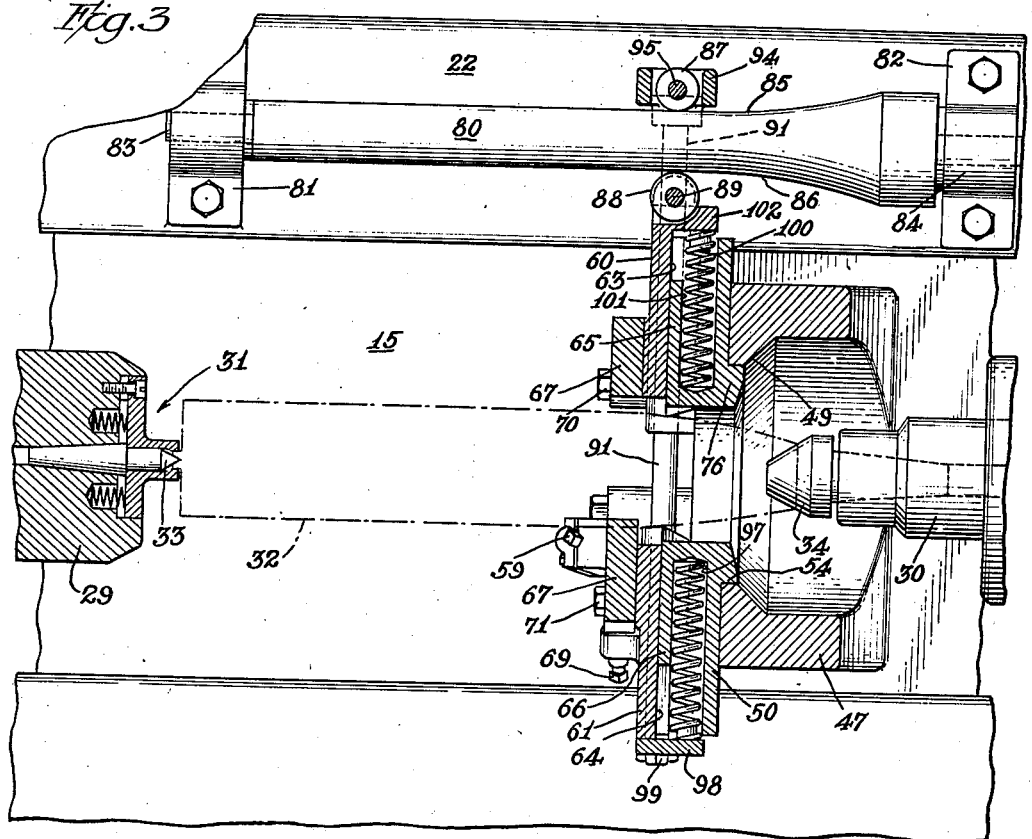
Fig. 3 is a fragmentary sectional view taken axially of the workpiece and former on line 3—3 of Fig. 2.
Figure 4:
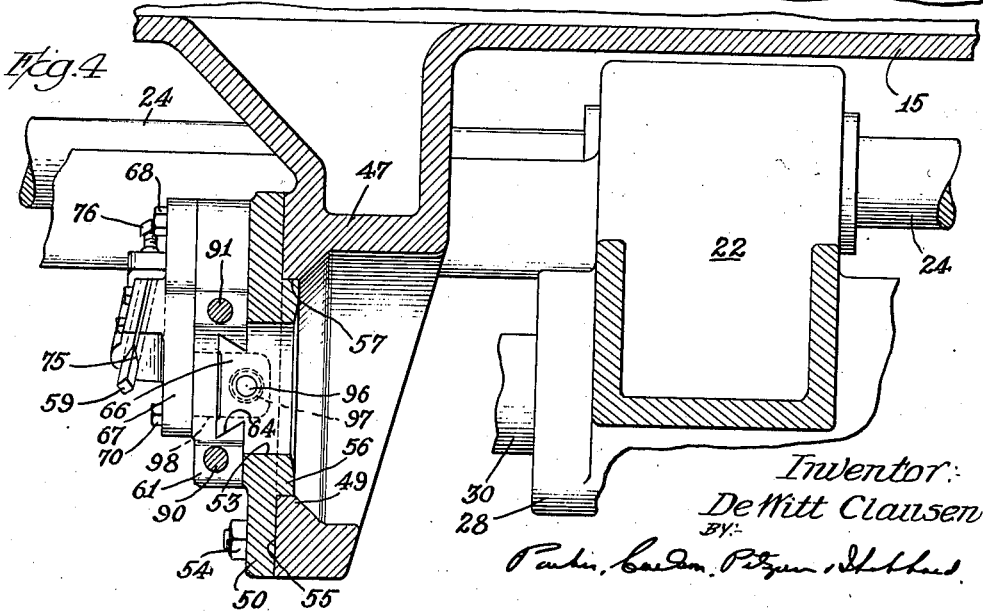
Fig. 4 is a fragmentary horizontal section taken along the line 4—4 of Fig. 2 and looking downwardly.

While the invention is susceptible of various modifications and alternative construction, I have shown in the drawings and will herein describe in detail, the preferred embodiments, but it is to be understood that I do not thereby intend to limit the invention to the specific forms disclosed, but intend to cover all modifications and alternative constructions falling within the spirit and scope of the invention as expressed in the appended claims.

The present invention has application to any form of turning machine wherein a workpiece is turned down to any particular contour of circular cross section. Thus, for example, the invention has been illustrated and will hereinafter be described in connection with a turning machine of the type disclosed in the copending joint application of Lucien I. Yeomans and DeWitt Clausen, Serial No. 337,760 filed May 29, 1940, now Patent 2,288,578 of June 30, 1942, wherein the workpiece is caused to rotate and reciprocate on a traveling carriage relative to a stationary toolhead (Figs. 1, 2, 3 and 4). A modified form of the invention has also been illustrated and will be described in connection with a conventional turning lathe wherein the tool is caused to reciprocate relative to a workpiece mounted for rotation on the machine base (Figs. 5, 6, 7, 8, 9 and 10) and thirdly, as applied to a conventional turret lathe (Fig. 11). It is to be understood, however, that, broadly, the concept of the present invention is applicable to any type of turning machine.

The turning machine disclosed in Figs. 1, 2, 3 and 4, for purposes of illustrating one application of the present invention, will be described only briefly, reference being made to the aforementioned joint application of Yeomans and Clausen for details which form no part of the present invention. Referring to Fig. 1 in particular, the machine comprises generally an elongated box frame 20 supported by pedestals 21 which may be suitably secured thereto in any desired manner. A work supporting carriage 22 is slidably supported for longitudinally traversing the frame along one side 23 thereof. To this end spaced parallel guideways 24 are supported one above the other in brackets 25 projecting from the side of the machine. The carriage being of a substantially rectangular open form is supported at its four corners on said guideways by suitable bearings 26. The carriage is equipped with a headstock 27 and a tailstock 28 in which spindles 29 and 30, respectively, are suitably journaled for rotatably supporting a workpiece 32 on centers 33 and 34, respectively, with its axis substantially paralleling the path of travel of the carriage. The headstock spindle is provided with suitable driving means, indicated at 31, for rotating the workpiece. Hydraulic means, indicated in part at 35, are provided for actuating the tailstock spindle for the purpose of clamping the workpiece between centers 33 and 34 of the headstock and tailstock, respectively. The headstock or live spindle 29 is suitably driven by means (not shown) connected through a gear box 36 with a drive shaft 37. Suitable drive means, generally indicated at 38, is provided for traversing the carriage.

A spindle clutch control lever 39 is mounted on the base for manual control of the headstock spindle drive. A feed clutch control and rapid traverse reverse clutch control lever 40 is suitably positioned on the top of the frame for manually controlling the carriage feed and rapid traverse reverse. Automatic means, generally indicated at 43, for stopping the carriage at the end of a feed stroke and again at the end of a rapid traverse reverse stroke, is positioned for engagement by a lug 44 projecting upwardly from the carriage. A handwheel 45, fixed on a shaft 46 transversely journaled in the carriage, is provided for manually positioning the carriage relative to the machine base. For a more detailed understanding of the spindle and carriage drive and control mechanisms, reference may be had to the aforesaid Yeomans and Clausen application.

Means are provided for mounting cutting tools peripherally about the workpiece for sliding movement radially thereof during rotation and longitudinal feed. To this end, a tool pedestal or knee 47 is rigidly secured to the side 15 of the machine and projects laterally therefrom into the open central portion of the carriage. The knee 47 is formed with a central aperture 49 through which the workpiece 32 is adapted to reciprocate and rotate between the headstock and tailstock on the carriage. A toolhead 50 having a corresponding central aperture 53 is bolted, as at 54, to a machined face 55 of the knee and centered thereon by an annular collar 56 formed on the toolhead for registration with a complementary seat 57 formed in the face of the knee.

In the present instance, a pair of cutting tools 58 and 59 are oppositely disposed relative to the workpiece, one above and one below, and are mounted for sliding movement on the toolhead transaxially of the workpiece. To this end, a pair of tool slides 60 and 61 provided with dovetail slots 63 and 64 for cooperation with complementary dovetails 65 and 66 formed on the toolhead are mounted thereon for vertical sliding movement, one above the workpiece and one below. Each slide carries a tool support 67, pivoted thereon, as at 68, for substantially radial tool adjustment by adjusting screw 69 and firmly secured to the slide by a pair of lock bolts 70 and 71 screw threaded therein through slots 72 and 73 in the tool support. Each tool is received in a pocket 75 where it is adjustable tangentially of the workpiece by an adjusting screw 76 screw threaded in the support and which serves also to prevent endwise movement of the tool incident to rotation of the workpiece.

One important feature of the present invention is to provide cam or former means fixed in spaced relation to the workpiece and contoured symmetrically for effecting synchronous transaxial movement of the cutting tools as an incident to relative longitudinal feed movement between the workpiece and former on the one hand and the tool support on the other. Thus in the present instance, the former or template, generally indicated at 80, is fixed on the carriage for reciprocatory movement therewith in spaced parallel relation to the workpiece. Brackets 81 and 82, secured to one of the longitudinal side members of the carriage, are adapted to receive and rigidly secure the ends 83 and 84 of said former to the carriage. The former, as illustrated in the present instance, is contoured reversely to the desired workpiece contour and is preferably of circular cross section throughout, providing at least two opposite symmetrical sides 85 and 86. A pair of roller followers 87 and 88 are positioned on said opposite sides for movement transversely of the former during axial reciprocatory movement thereof.

Means are provided for rigidly connecting each of said tools with one of said followers for causing relative transaxial movement between the tool and the workpiece in conformity with the side of the former which is located relatively opposite or in non-conforming relation to the side of said workpiece being engaged by the tool. Thus, as viewed in Figs. 2 and 3, the bottom or adjacent follower 88 is journaled, as at 89, in the tool slide 60 which carries the top or adjacent tool 58 while the top or remote follower 87 controls the bottom or remote tool 59. A pair of spaced tension rods 90 and 91, straddling the former, are secured to a yoke 94 in which the remote follower 87 is journaled, as at 95. The rods 90 and 91 extend slidably through the top and bottom tool slides to support the latter for movement in conformity with the top roller follower 87. A coil spring 96, seated in a pocket 97 in the toolhead and abutting a plate 98 bolted, as at 99, to the under side of the bottom tool slide, yieldably maintains a constant following engagement between the top follower and the former and prevents gouging of the workpiece by the bottom tool. Similarly a coil spring 100, seated in a pocket 101 in the toolhead, abuts an extended portion 102 of the top tool slide to yieldably maintain a constant following engagement between the bottom follower 88 and the former and prevent gouging of the workpiece by the top tool.

Utilizing a reverse former of the type having a circular cross section throughout, as illustrated in Figs. 1 to 4, inclusive, I have provided a novel method for turning a workpiece to duplicate a model thereof. Heretofore, the production of reverse cams and formers has been a laborious and time consuming task requiring extreme accuracy in the plotting of coordinates and in the execution of such coordinates to produce a finished reverse former. The present method is designed to eliminate these difficulties and provide a simple and expeditious process for producing a reverse former of circular cross section throughout from a model of the work to be produced.

A model of the work to be produced is positioned in a reverse contour turning machine, of the general type heretofore described, for use as a master former. A workpiece is positioned between the headstock and tailstock and is turned under the influence of the model to produce a former which is the reverse or complement of said model. This reversal is due to the fact that, during the relative movement between the model and the workpiece on the one hand and the cutting tool on the other, transaxial movement between the cutting tool and the workpiece is effected in conformity with the side of the model which is located relatively opposite to the side of the workpiece being engaged by the tool. The model is then replaced with the reverse former thus produced and a workpiece which is an exact duplicate of the model is produced under the influence of such a reverse former. This method results in extreme accuracy and exactness for the reason that the steps of producing the reverse former and subsequently producing a workpiece from such former are reversed, so that any inaccuracies in the one step are compensated and eliminated in the succeeding step.

Figs. 5 to 10, inclusive, disclose a modified form of the invention which is particularly well adapted for turning artillery shells, such as that illustrated at 103, which are usually provided with a straight cylindrical section 104 and a nose section 105 contoured to ogival or other rounded form. For turning the straight cylindrical section 104, a pair of cutting tools 106 and 107 are oppositely fixed in position relative to the axis of the workpiece, whereas, in the turning of the nose portion, a pair of cutting tools 108 and 109 are oppositely positioned relative to the axis of the workpiece for movement transaxially thereof under the control of a former.

The modified form disclosed is illustrated in connection with a conventional turning lathe shown in somewhat diagrammatic form in Fig. 5. The shell 103 may be supported in any suitable fashion for rotation between headstock and tailstock centers 110 and 111 respectively, supported on a machine bed 112. A tool carriage 113 is slidably supported on cylindrical ways 114 and 115 on the machine bed for longitudinal reciprocation axially of the workpiece. Two pairs of tool supports are mounted on the carriage, one pair, denominated 120 and 121, supporting the tools 106 and 107, respectively, and the other pair denominated 122 and 123 supporting tools 108 and 109, respectively. The tool supports 120 and 121 are mounted on the carriage for preliminary adjusting movement individually longitudinally and synchronously radially of the workpiece. Tool support 121 is also preliminarily radially adjustable individually relative to the workpiece and to the support 120.

To accomplish these adjustments, a pair of slides 124 and 125 are mounted on slideways 126 which extend across the carriage. The slides carry screw threaded sleeves 127 and 128, respectively, bolted thereto as at 129 and 130 for projection downwardly into a recess 133 formed between the slideways. An actuating screw 134, having oppositely threaded screw sections 135 and 136, is journaled as at 137 transversely in the carriage and its sections 135 and 136 are received in the sleeves 127 and 128, respectively. Actuation of the screw by a handwheel 138 at the front of the carriage, advances or retracts the slides synchronously relative to the axis of the workpiece. The slides 124 and 125 carry actuating screws 139 and 140, respectively, journaled therein for cooperation with tapped projections 143 and 144; the former projection is rigid with the tool support 120 which has a sliding dovetail relation with the slide 124 and the latter is rigid with an intermediate slide 148 which has a sliding dovetail relation with the slide 125. Separate adjustment of the actuating screws 139 and 140 effects movement of the tool supports longitudinally of the workpiece. The intermediate slide 148 is dovetailed as at 149 for cooperation with a dovetail recess 150 in the tool support 121 and carries an actuating screw 151 which is received in a tapped projection 152 in said tool support. Actuation of the screw 151 adjusts tool support 121 radially of the workpiece and relative to its opposed tool support 120.

The contour turning tools 108 and 109 are each adjustable preliminary to the turning operation for separate movement longitudinally of the workpiece and for the adjustment of tool 109 radially of the workpiece and relative to the tool 108. A pair of slides 153 and 154 are mounted on slideways 155 extending across the carriage. Slide 153 carries the tool support 122, the parts being slidably dovetailed, as indicated at 156. An actuating screw 157, journaled in the slide 153, has a screw threaded connection 158 with the support 122 for adjustment of tool 108 longitudinally of the workpiece. Slide 154 carries an intermediate slide 159 which in turn carries the tool support 123, the parts being slidably dovetailed as indicated at 160 and 161. An actuating screw 162, journaled in the slide 154, has a screw threaded connection 163 with intermediate slide 159 for adjustment of tool 109 longitudinally of the workpiece and an actuating screw 164, journaled in the intermediate slide 159 has a screw threaded connection with the tool support 123 for adjustment of tool 109 radially of the workpiece and relative to its opposed tool 108.

A former 170, having opposite symmetrical sides 171 and 172, is rigidly supported at its ends 173 and 174 on brackets 175 and 176 secured to the machine base. The former is disposed in spaced parallel relation to the workpiece and is contoured reversely to the workpiece similarly to the former 80 previously described. A pair of roller followers 177 and 178 are positioned on said opposite sides for movement transversely of the former during relative axial movement between the workpiece and the cutting tools.

Means is provided for connecting each of the oppositely disposed tools 108 and 109 with one of said followers for causing relative transaxial movement between the tool and the workpiece in conformity with the side of the former which is located relatively opposite to the side of said workpiece being engaged by the tool. The remote follower 177 is journaled in a support 179 slidable in the carriage (see Fig. 10) and which is connected through spaced tension rods 180 and 181 with a sleeve 182, bolted as at 183, to the slide 154 which carries the remote tool 109. The adjacent follower 178 is similarly journaled in a sliding support 184 which is connected with the means supporting the adjacent tool 108. This latter connection is adjustable for positioning the adjacent tool relative to its follower and is effected by means of an actuating screw 185 journaled in the follower support 184 and having a screw threaded relation with a sleeve 186, bolted, as at 187, on the adjacent tool slide 153. The actuating screw 185 is also journaled, as indicated at 188, for extension from the front of the carriage where it is actuated by a handwheel 189. A coil spring 190 extends between the sleeves 182 and 186 on the tool slides 153 and 154 for yieldably maintaining a constant following engagement between the followers and the former and also serving to prevent gouging of the workpiece by the tools.

It will be apparent that the tools 108 and 109 are controlled by the former for contouring the ogival portion 105 of the shell while the tools 106 and 107 are rigid with the carriage during the cutting operation to form the straight cylindrical section 104.

Another modification of the invention is disclosed in Fig. 11, wherein a conventional turret lathe construction is shown in somewhat diagrammatic form. The machine comprises generally a base 195 upon which a revolvable turret 196, having a plurality of forming tools 197, 198 and 199 spaced peripherally thereof, is mounted for longitudinal feed movement. A workpiece 200 is mounted for rotation on the machine base on a chuck, generally indicated at 201, and positioned for successive engagement by the forming tools as they are indexed on the turret.

The turret is indexed, in the position shown in Fig. 11, to position a contour turning attachment similar to that described with reference to Figs. 1 to 4, inclusive, for engagement with the workpiece 200. The attachment comprises a tool support 202 bolted, as at 203, to a peripheral face of the turret and supporting a toolhead 204, bolted thereto as at 205. The toolhead carries a pair of oppositely disposed tool slides 206 and 207 vertically slidable thereon. These carry toolholders 208 and 209 which position a pair of cutting tools 210 and 211 in oppositely disposed relation to the workpiece. A pair of roller followers 212 and 213 are connected, respectively, with the bottom and top tool slides 207 and 206 and are adapted for following engagement with a former 221 fixed on the machine base in spaced parallel relation to the workpiece. The top or remote follower 212 is journaled in a follower support 214 rigid with a pair of spaced tension members 215 and 216 which straddle the former and the workpiece for sliding engagement with the top or adjacent tool slide 206 and for connection with the bottom or remote tool slide 207. A coil spring 217, seated in the toolhead, abuts against a plate 218 bolted to the underside of the bottom tool slide 207, for yieldably maintaining a constant following engagement between the remote follower and the former. The bottom or adjacent follower 213 is journaled in the top tool slide 206 and is similarly yieldably urged into constant following engagement with the former by a coil spring 219 seated in the toolhead and abutting a projection 220 formed on said top tool slide 206.

As the turret is fed longitudinally of the former and workpiece while the latter is rotated, the followers engage the opposed sides of a conical end portion 222 of the former 221 and are spread apart to initiate their following relation with the former. When the tools reach the workpiece the followers are positioned to control their transaxial cutting movement in accordance with the symmetrical opposite sides of the reverse former.

I claim as my invention:

1. A turning machine having, in combination, means for rotating a workpiece having axially spaced areas to be turned to different diameters, a symmetrical reverse former fixed in spaced parallel relation to said workpiece, a support relatively movable axially of said workpiece and said former, two followers mounted on said support for movement transversely of and for coaction with the opposite symmetrical sides of said former, and two cutting tools oppositely disposed for advancement and retraction relative to the axis of the work, each tool being supported for joint movement with one of said followers, said tools and said followers being in substantial alinement.

2. A turning machine comprising, in combination, means for supporting a workpiece, means for supporting a pair of cutting tools at diametrically opposite sides of said workpiece, means for effecting relative rotation and longitudinal reciprocation between said workpiece and said cutting tools, and means for advancing and retracting said tools in synchronism relative to the axis of said workpiece, said last mentioned means including a former having opposite symmetrical sides contoured reversely to the desired workpiece contour and fixed in spaced parallel relation to said workpiece, and a pair of followers each paired with one of said tools and each coacting with one of said opposite symmetrical sides for synchronous movement transversely of said former, said tools and said followers being in substantial alinement.

3. A turning machine comprising, in combination, means for supporting a workpiece, means for supporting a pair of cutting tools at diametrically opposite sides of said workpiece, means for effecting relative rotation and longitudinal reciprocation between said workpiece and said cutting tools, and means for advancing and retracting said tools in synchronism relative to the axis of said workpiece, said last mentioned means including a former fixed in spaced parallel relation with respect to said workpiece and having a side remote from said workpiece symmetrical with an opposite side near said workpiece, a remote side follower connected with the tool on the remote side of said workpiece, and a near side follower connected with the tool on the near side of said workpiece.

4. In a turning machine for effecting relative rotation and longitudinal feed between a tool support and a workpiece having axially spaced areas to be turned to different diameters, the combination of a reverse former of circular cross section fixed in spaced parallel relation to said workpiece, a pair of cutting tools oppositely disposed relative to the diameter of said workpiece, each mounted on said tool support for movement transaxially of said workpiece, and a pair of followers oppositely disposed with respect to the diameter of said former, said diameter being substantially in a straight line and each of said followers being separately connected with one of said tools for effecting transaxial movement of each cutting tool relative to the workpiece in conformity with the side of said former which is located relatively opposite to the side of said workpiece being engaged by the tool.

5. In a turning machine for effecting relative rotation and longitudinal feed between a tool support and a workpiece having axially spaced areas to be turned to different diameters, the combination of a reverse former having contoured cam faces on its opposite sides and fixed in spaced parallel relation to said workpiece, a pair of former followers coacting with said cam faces and adapted for separate movement transversely of said former, a pair of tools oppositely disposed relative to said workpiece, each mounted on said tool support for movement transaxially of said workpiece, and means connecting each of said followers with one of said tools for effecting relative transaxial movement between each tool and the workpiece in conformity with the side of said former which is located relatively opposite to the side of said workpiece being engaged by the tool.

6. A turning machine comprising, in combination, a work support, a tool support, a former having a contour the reverse of that of the workpiece to be turned, means for rotating said work support, means for effecting relative feeding movement between said tool support on the one hand and said work support and former on the other, a pair of tools movably mounted on said tool support in position to engage the workpiece at circumferentially spaced points thereon, a pair of follower elements movably mounted to engage said former at corresponding circumferentially spaced points thereon, said tools and said followers being in substantial alinement, means connecting the follower element nearer to the workpiece to the tool nearer to the former, and means connecting the follower element farther from the workpiece to the tool farther from the former, to effect synchronous approach and recession of the tools transaxially of the workpiece in conformity with the contour of said former during the aforesaid relative feeding movement.

7. A turret lathe comprising, in combination, means for rotatably supporting a workpiece, a reverse former having opposite symmetrical sides fixed in spaced parallel relation to said workpiece, a revolvable lathe turret having a plurality of tools mounted for radial extension peripherally thereof, one of said tools including a toolhead, a pair of followers separately movable on said toolhead transversely of said former for coaction with said opposite sides when said turret is positioned for utilizing said one tool, a pair of cutting tools on said tool head each connected with one of said followers and adapted for synchronous radial advancement and retraction relative to and from diametrically opposite sides of the axis of said workpiece under the influence of said former, said tools and said followers being in substantial alinement, and means for effecting relative longitudinal feed between said workpiece and former on the one hand and said turret on the other.

8. A turret lathe comprising, in combination, means for rotatably supporting a workpiece, a former fixed in spaced parallel relation to said workpiece and having a side remote from said workpiece symmetrical with an opposite side near said workpiece, a lathe turret having a plurality of tools mounted thereon, one of said tools including a toolhead, a pair of followers each cooperating with one of said sides, separate means in support of each follower and freely movable on said toolhead transversely of said workpiece and said former when said turret is indexed for utilizing said one tool, a pair of cutting tools on said tool head each connected with one of said followers and adapted for synchronous radial advancement and retraction relative to and from diametrically opposite sides of the axis of said workpiece in conformity with the side of said former which is located relatively opposite to the side of said workpiece being engaged by the tool, and means for effecting relative longitudinal feed between said workpiece and said turret.

9. A turning machine comprising, in combination, a base, a carriage mounted for longitudinal traverse on said base, means on said carriage for rotatably supporting a circular workpiece with its axis parallel to the path of traverse of said workpiece, a tool support on said base and disposed adjacent said path, a reverse former of circular cross section fixed on said carriage in spaced parallel relation to said workpiece, a pair of followers oppositely disposed with respect to the diameter of said former, a pair of cutting tools oppositely disposed with respect to the diameter of said workpiece, said diameters being in substantially a straight line, and means on said toolhead for connecting each tool with one of said followers for equal synchronous radial advancement and retraction of said tools relative to the axis of said workpiece upon traversing movement of said carriage.

10. A lathe comprising, in combination, a base, a tool carriage mounted for traversing movement on said base, means on said base for rotatably supporting a workpiece having axially spaced areas to be turned to different diameters, a reverse former having opposite symmetrical sides fixed on said base in spaced parallel relation to said workpiece, a pair of followers each freely movable on said tool carriage transversely of said former for coaction with said opposite sides, and a pair of cutting tools each connected with one of said followers and adapted for separate synchronous radial advancement and retraction relative to the axis of said workpiece under the influence of said followers, the movement of each tool being in conformity with the side of said former which is located relatively opposite to the side of said workpiece being engaged by the tool.

11. In a turning machine wherein relative rotational and longitudinal feed movement is effected between a tool support and a circular workpiece to be turned, a contouring attachment comprising, in combination, a former paralleling said workpiece, followers coacting with directly opposite sides of said former, tools coacting with diametrically opposed sides of said workpiece, said tools and said followers being substantially in alinement, and means connecting each tool with a follower, the opposite disposition of the tools and followers relative to the workpiece and former respectively being such that each is subjected to equal and opposite bending stresses.

12. In a turning machine wherein relative rotational and longitudinal feed movement is effected between a tool support and a circular workpiece having axially spaced areas to be turned to different diameters, the combination of a reverse former fixed in spaced parallel relation to said workpiece and having opposite symmetrical sides, a pair of cutting tools on said support oppositely disposed diametrically of the axis of said workpiece, and a pair of former followers each fixed relative to one of said tools, said tools and said followers being substantially in alinement, the relationship being such that equal and opposite cutting force is exerted through the workpiece to each tool causing equal and opposite follower force on the former whereby neither workpiece nor former are subjected to bending stress.

DE WITT CLAUSEN.